United States Patent
Blink et al.

(10) Patent No.: US 6,542,751 B1
(45) Date of Patent: Apr. 1, 2003

(54) MULTI-MODE PAGING SYSTEM

(75) Inventors: Russell P. Blink, Plano, TX (US); Kenneth J. Lovegreen, Lake Kiowa, TX (US)

(73) Assignee: Long Range Systems, Inc., Dallas, TX (US)

( * ) Notice: Subject to any disclaimer, the term of this patent is extended or adjusted under 35 U.S.C. 154(b) by 0 days.

(21) Appl. No.: 09/451,368

(22) Filed: Nov. 27, 1999

(51) Int. Cl.$^7$ ................................................ H04Q 7/20
(52) U.S. Cl. ...................... 455/458; 455/445; 455/426; 455/461; 340/7.29; 340/825.28
(58) Field of Search ................................. 455/461, 458, 455/459, 466, 426, 517, 414, 445, 456; 340/7.1, 7.24, 825.5, 825.53, 10.31, 825.28, 7.29

(56) References Cited

U.S. PATENT DOCUMENTS

| | | | | |
|---|---|---|---|---|
| 5,260,986 A | | 11/1993 | Pershan | 379/57 |
| 5,533,097 A | * | 7/1996 | Crane et al. | 340/7.1 |
| 5,768,356 A | | 6/1998 | McKendry et al. | 379/201 |
| 5,777,560 A | * | 7/1998 | Sakai et al. | 340/7.27 |
| 5,907,795 A | * | 5/1999 | Hwang | 340/7.33 |
| 5,928,325 A | * | 7/1999 | Shaughnessy et al. | 709/206 |
| 5,930,338 A | * | 7/1999 | McKendry et al. | 379/142.07 |
| 5,956,640 A | * | 9/1999 | Eaton et al. | 455/432 |
| 5,983,074 A | * | 11/1999 | Jansen | 340/7.1 |
| 6,058,178 A | * | 5/2000 | McKendry et al. | 379/212.01 |
| 6,233,430 B1 | * | 5/2001 | Helferich | 455/458 |
| 6,259,892 B1 | * | 7/2001 | Helferich | 340/7.2 |
| 6,378,073 B1 | * | 4/2002 | Davis et al. | 235/379 |
| 6,411,682 B1 | * | 6/2002 | Fuller et al. | 379/67.1 |

FOREIGN PATENT DOCUMENTS

| | | | | |
|---|---|---|---|---|
| EP | 0695074 A2 | * | 1/1996 | H04M/3/54 |
| WO | WO 9934624 | * | 7/1999 | H04Q/7/08 |

* cited by examiner

*Primary Examiner*—Edward F. Urban
*Assistant Examiner*—Khawar Iqbal
(74) *Attorney, Agent, or Firm*—Steven W. Smith

(57) ABSTRACT

A system and method of selectively paging an individual through one of a plurality of paging mechanisms. An indication of a paging mechanism for each individual to be paged is stored in a memory device. When an input is received from a user to page the individual, a control processor retrieves the indication of a paging mechanism for the individual to be paged and determines which of the plurality of paging mechanisms is to be utilized to page the individual. The individual may be selectively paged through an on-premises paging system, a wide area paging system, or a cellular telephone.

13 Claims, 7 Drawing Sheets

MULTI-MODE PAGING SYSTEM

BACKGROUND OF THE INVENTION

1. Technical Field of the Invention

This invention relates to radio paging systems and, more particularly, to a multi-mode paging system that selectively pages an individual through one of a plurality of paging mechanisms.

2. Description of Related Art

Many business establishments today utilize on-premises radio paging systems to locate employees or notify customers when service is available. For example, hospitals may page for doctors, and restaurants may page customers to notify them when their table is ready. In the context of the restaurant usage, a customer is typically greeted by a hostess who informs the customer that there is a waiting period for a table, and provides the customer with an on-premises pager. The pager has a control number associated with it, and the hostess enters the control number, either manually or electronically, into a pager controller. When the customer's table is ready, the hostess inputs this information to the controller. The controller instructs a low power, on-premises transmitter to page the pager with the associated control number. The customer's pager then notifies the customer through an audio, visual, or vibratory indication that the table is ready.

There are several disadvantages with the existing on-premises paging system. First, if the customer wanders too far away from the on-premises transmitter, the pager may not receive the page. Thus, the customer may miss the indication that his table is ready if he has to go to his car in the parking lot. Second, restaurants have a major problem with loss and breakage of the on-premises pagers. Some customers steal the pagers while others inadvertently leave with them after deciding among themselves that they do not want to wait for a table. Other pagers are damaged when they are dropped or otherwise mistreated by waiting customers.

There are no known prior art teachings of a solution to the aforementioned deficiency and shortcoming such as that disclosed herein. In order to overcome the disadvantage of existing on-premises paging systems, it would be advantageous to have a multi-mode paging system that selectively pages an individual through one of a plurality of paging mechanisms. Such a system would decrease the restaurant's reliance on on-premises pagers, and would provide greater flexibility and roaming range to waiting customers. The present invention provides such a system.

SUMMARY OF THE INVENTION

In one aspect, the present invention is a multi-mode paging system that selectively pages an individual through one of a plurality of paging mechanisms. The system includes a first paging mechanism comprising an on-premises radio frequency (RF) transmitter for paging on-premises pagers, a second paging mechanism comprising means for dialing out a telephone call to wide area pagers or cellular telephones, and a control processor that selects an appropriate paging mechanism for each individual to be paged.

In another aspect, the present invention is a method of selectively paging an individual through one of a plurality of paging mechanisms. The method includes the steps of determining by a control processor, which of the plurality of paging mechanisms is to be utilized to page the individual, and paging the individual utilizing the determined paging mechanism.

In another aspect, the method begins by storing in a memory device, an indication of a paging mechanism for each individual to be paged. When an input is received from a user to page the individual, a control processor retrieves the indication of a paging mechanism for the individual to be paged and determines which of the plurality of paging mechanisms is to be utilized to page the individual. This is followed by paging the individual through an on-premises paging system upon determining that the on-premises paging system is to be utilized to page the individual, paging the individual through a wide area paging system upon determining that the wide area paging system is to be utilized to page the individual, and paging the individual through a cellular telephone upon determining that the cellular telephone is to be utilized to page the individual.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a multi-mode paging system and method. When installed in a premises such as a restaurant, the system enables the restaurant owner to page customers who are waiting for a table using either the customer's cellular telephone, their wide-area pager, or an on-premises pager supplied to the customer by the restaurant. If the customer has a cellular telephone or wide-area pager, a hostess enters either the customer's cellular telephone number or their wide-area pager number in a control computer and receives an identification number in response. If the customer does not have a cellular telephone or wide-area pager, an on-premises pager is provided. The control computer includes an RS232 interface for interfacing with other systems such as a seating management system, and a modem for dialing out to the customer's cellular telephone number or their wide-area pager telephone number.

Figure 1:
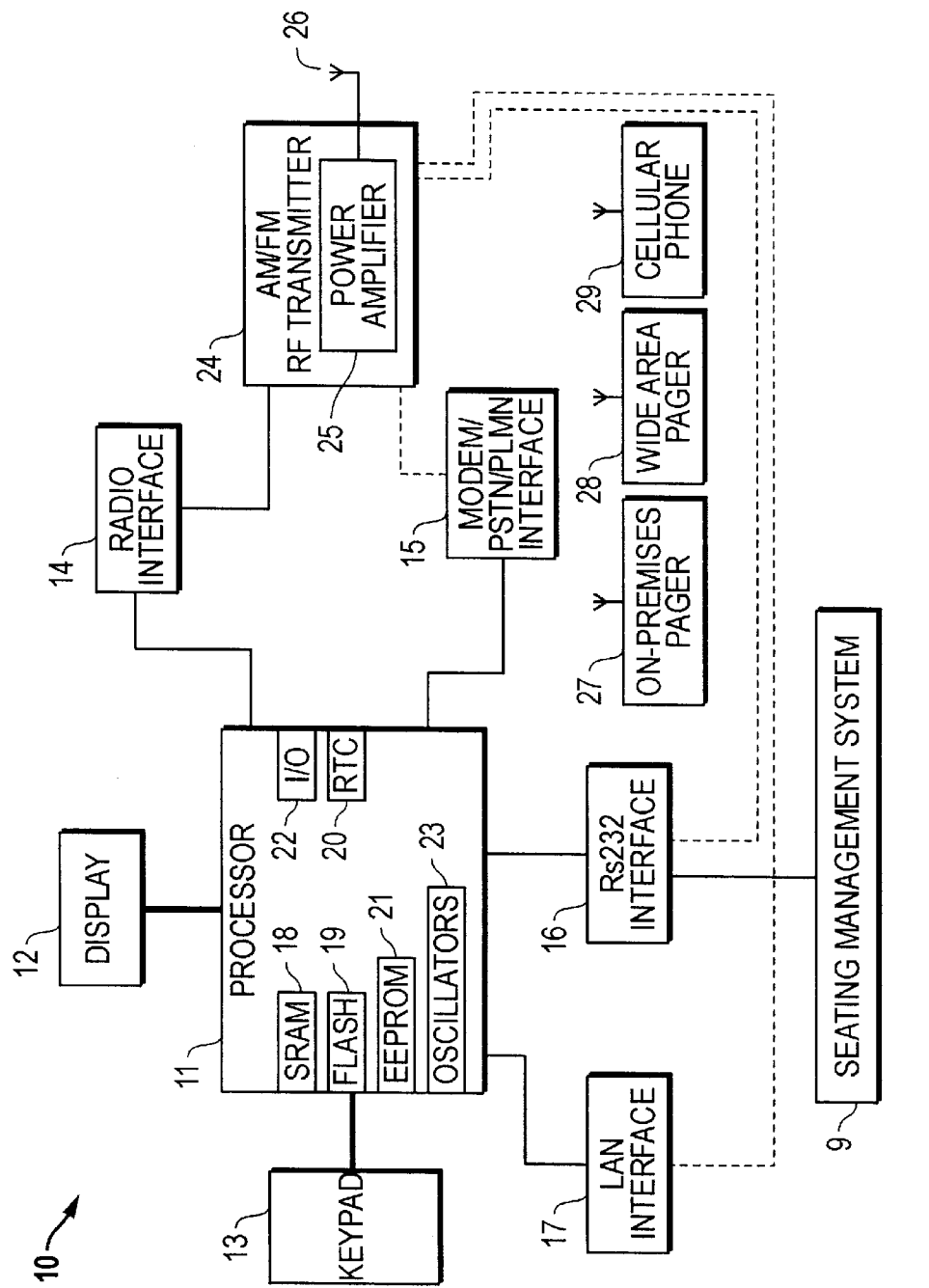
FIG. 1 is a simplified block diagram of the preferred embodiment of the system of the present invention.

FIG. 1 is a simplified block diagram of the preferred embodiment of the multi-mode paging system 10 of the present invention. The system is a processor-based paging unit in which a processor 11 is connected to a display 12 such as an LCD display, a keypad input device 13, a radio interface 14 to an on-premises RF transmitter (AM and narrow band FM) 24, a modem/Public Switched Telephone Network (PSTN)/Public Land Mobile Network (PLMN) interface 15, an RS232 serial interface 16 for connecting to other systems such as a seating management system 9, and a Local Area Network (LAN) interface 17. The LCD display may be, for example, a 4 line by 16 character module. The keypad input device may be, for example, a 4 column by 5 row membrane switch.

The processor functional block includes a Static Random Access Memory (SRAM) 18 for storing working variables and the protocol stack; a non-volatile re-writeable memory (FLASH) 19 for storing an executable program; a Real Time Clock (RTC) 20 for keeping the time of day; an EEPROM 21 for storing configuration data; Input/Output (I/O) resources 22 to interface to the display, keypad, RF transmitter, and PSTN/PLMN; and oscillators 23 for both the RTC 20 and the processor.

The radio interface 14 may be a wired or wireless interface which, in the preferred embodiment, connects the processor 11 to the AM/FM radio frequency (RF) transmitter 24. Alternatively, the processor may be remotely located from the premises and the transmitter, and may be connected to the transmitter via the modem 15, the RS232 interface 16, or the LAN interface 17. In this configuration, ID numbers for on-premises pagers, and telephone numbers for wide area pagers and cellular telephones may be entered at the premises and remotely communicated to the control processor. Additionally, tasks such as changing the system setup or operating mode can be performed remotely.

The RF transmitter implements a RF source and a modulator capable of AM and FM operation along with a power amplifier 25 to drive an antenna 26. As described below, the processor controls the multi-mode paging system to selectively page individual users utilizing the RF transmitter 24 and an on-premises pager 27, or the modem/PSTN/PLMN interface 15 and either a wide area pager 28 or a cellular telephone 29.

Figure 2:
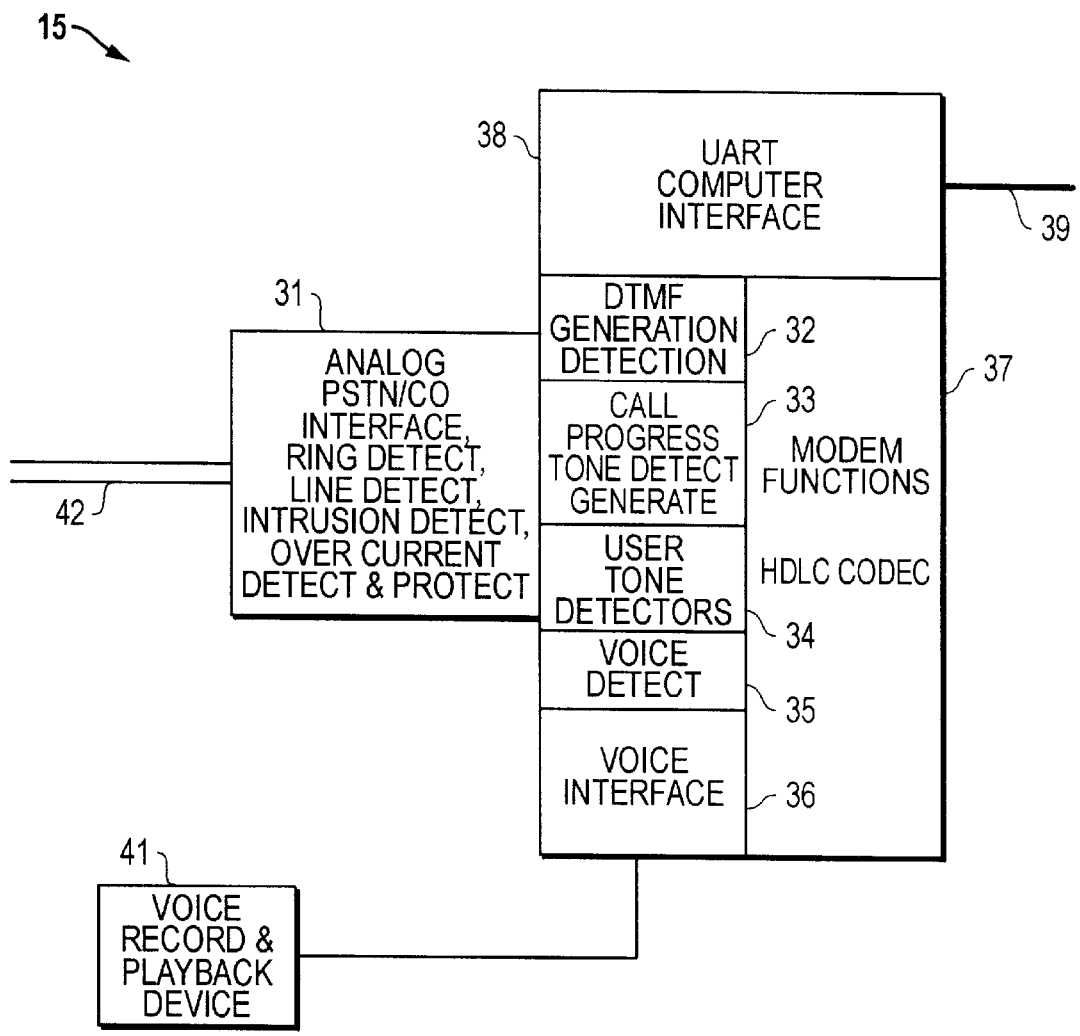
FIG. 2 is a functional block diagram of a modem and interfaces in the preferred embodiment of the system of the present invention.

FIG. 2 is a functional block diagram of the modem/PSTN/PLMN interface 15 in the preferred embodiment of the system of the present invention. The modem/PSTN/PLMN interface includes an analog PSTN/Central Office (CO) termination 31, a Dual Tone Multiple Frequency (DTMF) detector and generator 32, a Call Progress tone detector and generator 33, general purpose user tone detector(s) and generator(s) 34, a voice detector 35, a voice interface 36, a modem 37 with High Level Data Link Control (HDLC) coder/decoder (CODEC), and a Universal A synchronous Receiver-Transmitter (UART) computer interface 38 which utilizes a serial processor interface 39 to interface with the processor 11. The modem/PSTN/PLMN interface may also connect to a voice recording and playback device 41.

The PSTN/CO termination 31 connects to a phone line 42 and provides proper loop current control as well as overcurrent protection, intrusion detection when another party tries to seize the same line, single and bi-phase ring detection, forward and reverse loop current detection and surge protection. The DTMF detectors and generators 32 implement a full matrix of sixteen tone pairs with correct twist and cadence detection for automatic dialing. The call progress tone detector 33 implements standard as well as user-definable detection protocols. The modem 37 implements all standard signal protocols, BELL and ISO, from 300 to 2400 baud.

Figure 3A:
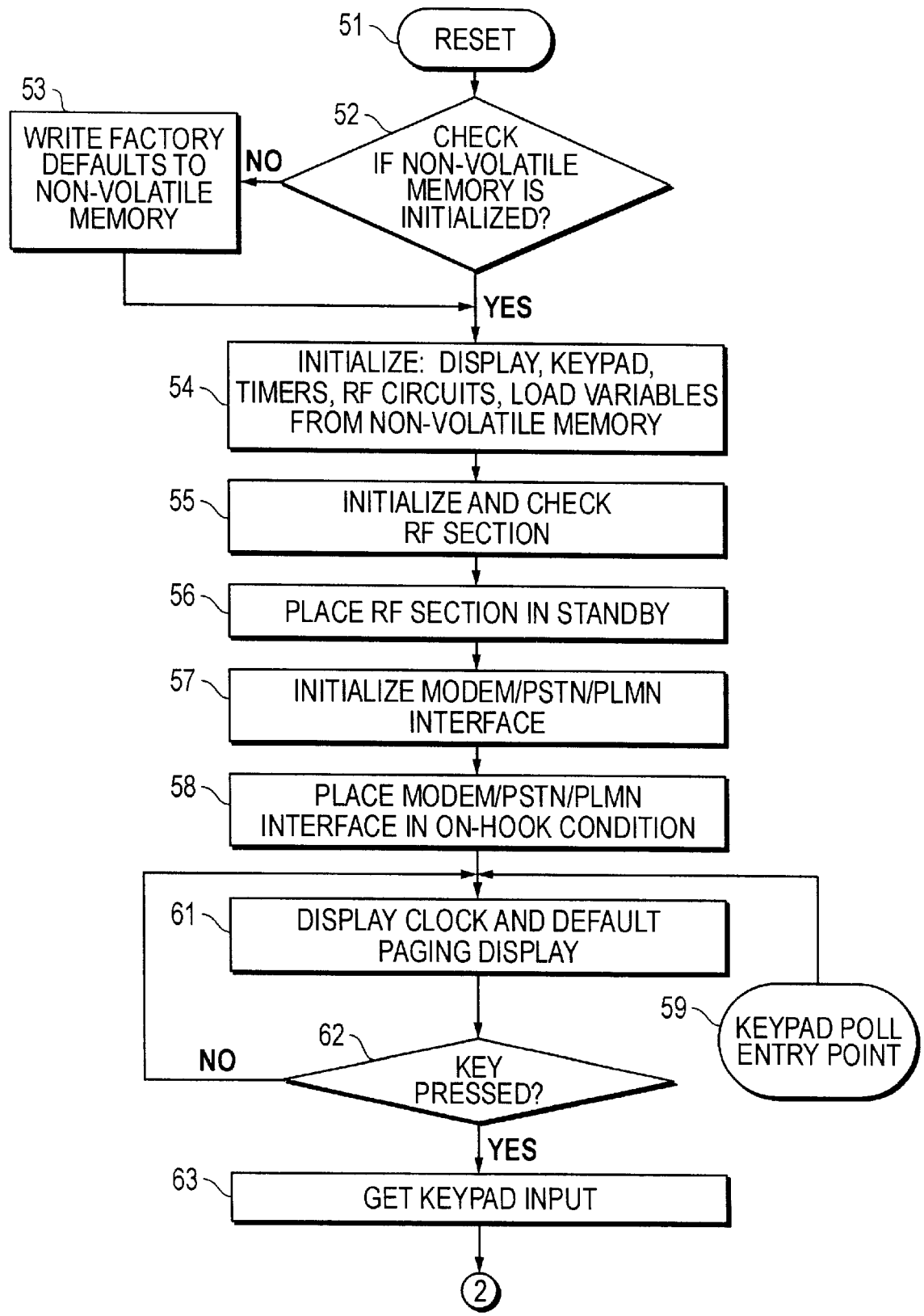
FIGS. 3A and 3B are a flow chart illustrating the steps of a main process performed in the method of the present invention.
Figure 3B:
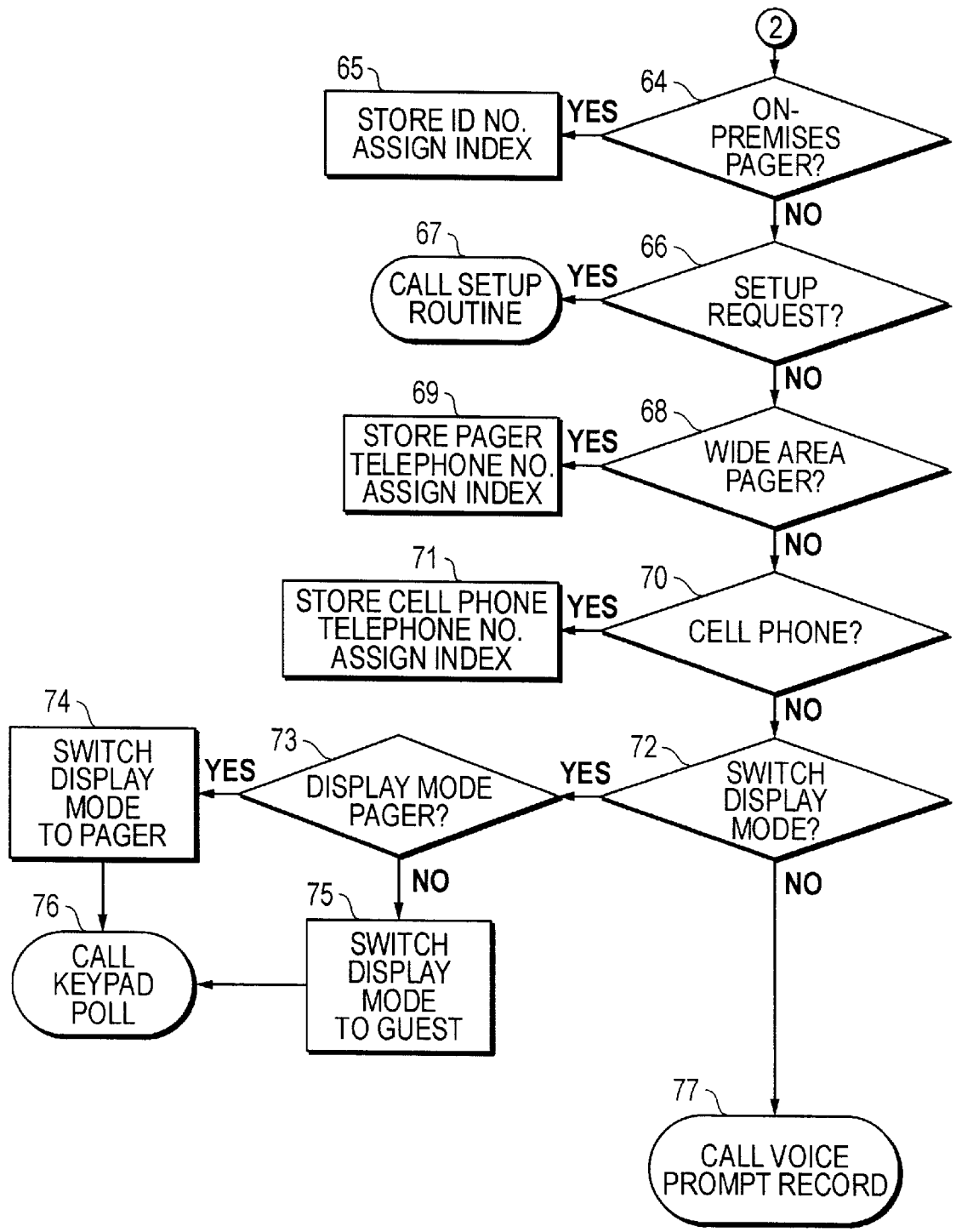

FIGS. 3A and 3B are a flow chart illustrating the steps of a main process performed in the method of the present invention. From a powered off state to a powered on state, or after a reset at step 51, the system executes an initialization procedure to ensure proper operation. First the processor timers, I/O interfaces and interrupts are correctly initialized followed by the display and keypad. At step 52, the non-volatile memory is checked for previous initialization, and if none is detected, the process moves to step 53 where factory default settings residing in the program memory 21 are written to the non-volatile memory 19. If the non-volatile memory is initialized, or factory default settings are loaded, the process moves to step 54 where the operating variables are loaded from the non-volatile memory, and any other initialized data is properly set to default values. Following these operations, the RF section is initialized and checked for proper operation at 55 and then placed in a stand-by mode at 56. At step 57, the PSTN interface is initialized, and then placed in an ON-HOOK condition at 58 monitoring the presence of a phone line.

The system then performs several steps to implement a user interface with the LCD display 12 and the keypad input device 13. After system initialization from a powered off state, the display indicates a prompt at step 59 for the user to make an entry on the keypad. At step 61, the display then displays the clock setting and a default paging mode. At 62, it is determined whether or not the user presses a selection key. If not, the process indicates another prompt for the user to make an entry. If a key is pressed, the process moves to step 63 and gets the keypad input.

The keypad indicates the following functions:

| Keys | Function |
| --- | --- |
| 0–9 | Numeric entry |
| SETUP | Enters the user programming mode |
| CELL | Used to designate a cell phone page |
| PGR | Used to designate an on-premises page |
| WAP | Used to designate a wide area page |
| STAFF | Switches to staff paging mode |
| CLEAR | Erases current data being entered |
| ENTER | Accepts data being entered |
| F1–F4 | Special function keys |

The special function keys can be used in two ways, first their function is modal depending on the state of the transmitter and what function is being implemented and second, the display indicates on the last row above each key what function the key represents.

The process then moves to FIG. 3B, step 64 where it is determined whether the user requested an on-premises page. If so, the process moves to step 65 where a pager identification number for an on-premises pager is entered and stored. The control processor then assigns an index number for the on-premises pager. Later, when the user enters the assigned index number, the paging algorithm (FIG. 4) is utilized to call the on-premises pager. If the user did not request an on-premises page at 64, the process moves to step 66 where it is determined whether the user requested that system setup be performed. If so, the process moves to step 67 where a setup routine is performed. If the user did not request system setup at 66, the process moves to step 68 where it is determined whether the user requested to enter a wide area pager telephone number. If so, the process moves to step 69 where the telephone number is entered and an index number is assigned. Later, when the user enters the assigned index number, the paging algorithm is called and utilized to call the wide area paging telephone number supplied.

If the user did not request a wide area page at 68, the process moves to step 70 where it is determined whether the user requested to enter a cellular telephone number. If so, the process moves to step 71 where the telephone number is entered and an index number is assigned. Later, when the user enters the index number, the paging algorithm is called and utilized to call the cellular telephone number supplied.

The index numbers may be set up many ways. For example, blocks of numbers may be allocated for on-premises pagers, wide area pagers, and cellular telephones. In an exemplary scenario, the index numbers are allocated as follows:

| Index Number | Allocation |
| --- | --- |
| 1–250 | On-Premises Pagers |
| 251–500 | Wide Area Pagers |
| 501–750 | Cellular Telephones |
| 751–999 | Future Use |

If the user did not request to call a cellular telephone at 70, the process moves to step 72 where it is determined whether the user has switched the display mode. If so, the process moves to step 73 where it is determined whether the user requested to switch the display mode to PAGER. If so, the process moves to step 74 and switches the display mode to PAGER. If not, the process moves to step 75 and switches the display mode to GUEST. The keypad then returns to the keypad poll state at 76 awaiting further user entries. If the user did not switch the display mode at step 72, the process moves to step 77 where a voice prompt recording routine (FIG. 6) is performed.

Figure 4:
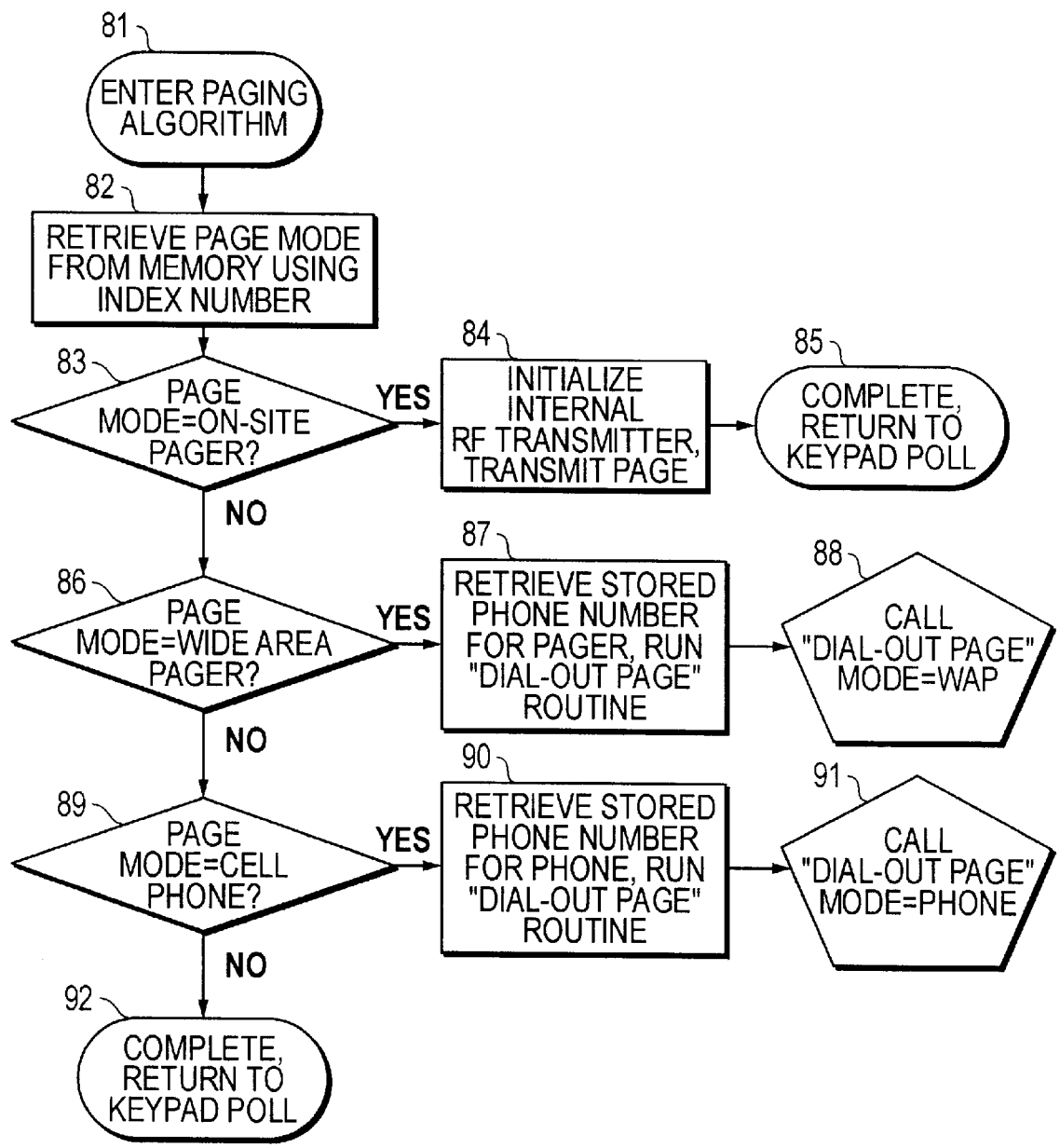
FIG. 4 is a flow chart illustrating the steps of a process performed by a paging algorithm in the method of the present invention.

FIG. 4 is a flow chart illustrating the steps performed by the paging algorithm in the method of the present invention. The paging algorithm is entered at step 81 when the user enters an index number. At step 82, a Page Mode is retrieved from memory using the index number entered by the user. For example, if the user enters an index number in the range 1–250, the retrieved Page Mode indicates an on-premises pager; if the user enters an index number in the range 251–500, the retrieved Page Mode indicates a wide area pager; if the user enters an index number in the range 501–750, the retrieved Page Mode indicates a cellular telephone.

At step 83, it is determined whether the Page Mode indicates an on-premises pager. If so, the process moves to step 84 where the on-premises RF transmitter 24 is initialized, and the on-premises page is transmitted. The process is then complete, and the keypad then returns to the keypad poll state at 85. If the Page Mode did not indicate an on-premises pager at 83, the process moves to step 86 where it is determined whether the Page Mode indicates a wide area pager. If so, the process moves to step 87 where the stored telephone number for the wide area pager is retrieved from memory, and the dial-out page routine (FIG. 5) is performed at step 88 utilizing dial-out page mode Wide Area Page (WAP).

If the Page Mode did not indicate a wide area pager at 86, the process moves to step 89 where it is determined whether the Page Mode indicates a cellular telephone. If so, the process moves to step 90 where the stored telephone number for the cellular telephone is retrieved from memory, and the dial-out page routine (FIG. 5) is performed at step 91 utilizing dial-out page mode PHONE. If the Page Mode did not indicate a cellular telephone at 89, the process moves to step 92 where the keypad then returns to the keypad poll state.

Figure 5:
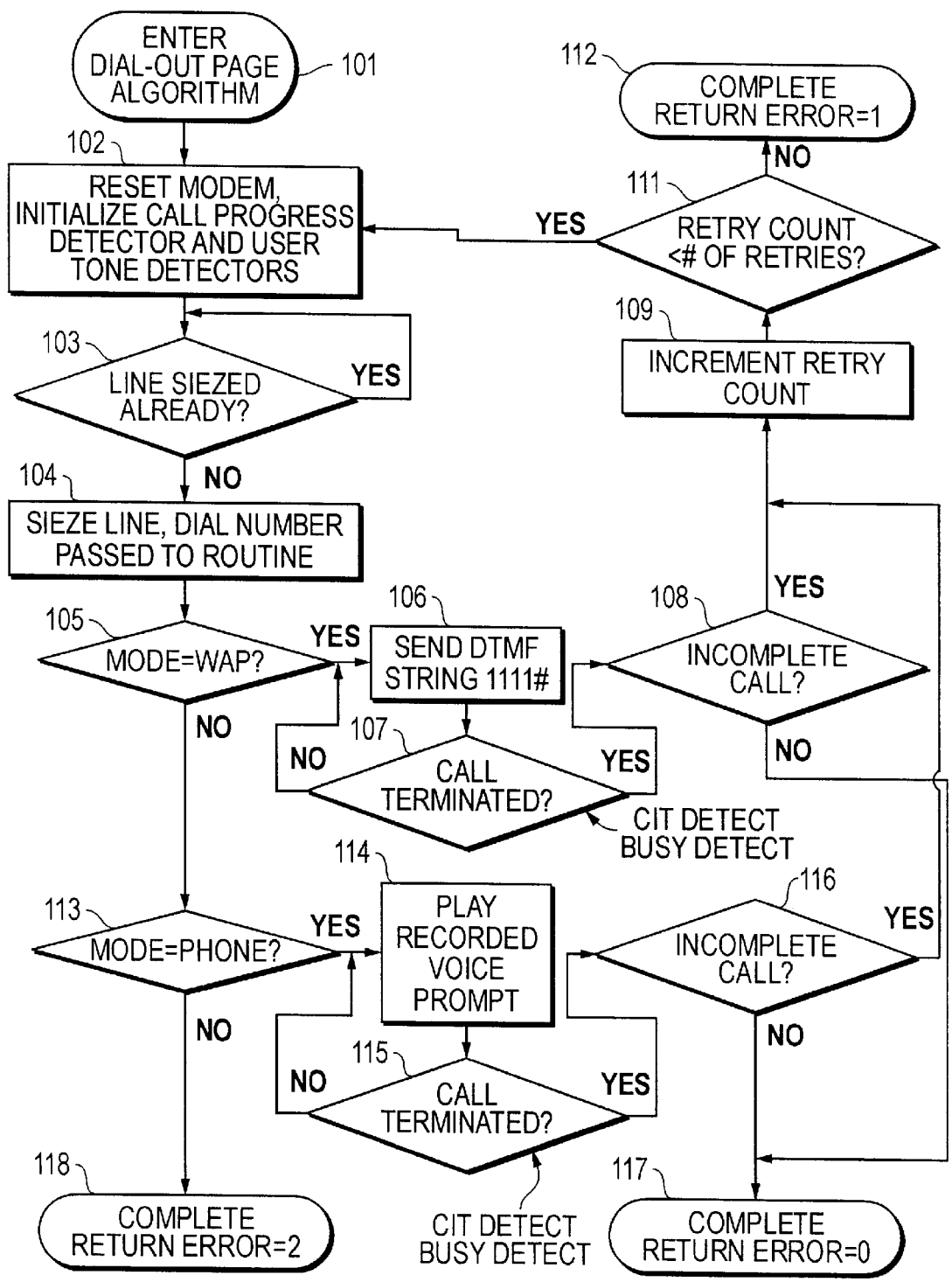
FIG. 5 is a flow chart illustrating the steps of a dial-out page routine performed in the method of the present invention.

FIG. 5 is a flow chart illustrating the steps of the dial-out page routine performed in the method of the present invention. The dial-out page routine is entered at step 101, and at step 102, the modem is reset, and the call progress tone detector 33 and the user tone detectors 34 are initialized. At step 103, it is determined whether or not a telephone line is already seized. If so, the process waits for a line to become available. If not, the process moves to step 104 and seizes a line and passes the telephone number to be dialed to the routine.

At step 105, it is determined whether the Page Mode is Wide Area Page (WAP). If so, the process moves to step 106 where the DTMF tones for the string 1111# is sent. At step 107, CIT Detect and Busy Detect are performed to determine whether the call has been terminated. If not, the process returns to step 106 and continues to send the DTMF string 1111#. If the call has been terminated, the process moves to step 108 where it is determined whether or not the call is an incomplete call. If the call is incomplete, the process moves to step 109 where a retry counter is incremented. At step 111, it is determined whether or not the retry count is less than an allowed number of retries. If so, the process returns to step 102 and attempts the process again. If the retry count equals the allowed number of retries, the process is halted, and an error code=1 is returned at 112.

If it is determined at step 105 that the Page Mode is not WAP, the process moves to step 113 where it is determined whether the Page Mode is PHONE. If so, a recorded voice prompt is played at step 114. At step 115, CIT Detect and Busy Detect are performed to determine whether the call has been terminated. If not, the process returns to step 114 and continues to play the recorded voice prompt. If the call has been terminated, the process moves to step 116 where it is determined whether or not the call is an incomplete call. If the call is incomplete, the process moves to step 109 where a retry counter is incremented. At step 111, it is determined whether or not the retry count is less than an allowed number of retries. If so, the process returns to step 102 and attempts the process again. If the retry count equals the allowed number of retries, the process is halted, and an error code=0 is returned at 117. If the Page Mode did not indicate PHONE at 113, the process moves to step 118 where an error code=2 is returned.

One of the first functions a user needs to do is record the voice prompts used when paging cellular telephones. This may be accomplished by connecting the transmitter to a standard analog telephone line using either of the two RJ11 connectors provided, and then connecting a local telephone handset to the second connector. The user then takes the handset off the hook, waits for the dial-tone, and then dials any digit other than "0" to break the central office (CO) dial-tone. The user now presses and holds a Function (F) key to select the type of voice prompt to be recorded. For example, the user may press "F1" to record a guest prompt, "F2" to record a server prompt, or "F3" to record a manager prompt, with "F4" being reserved for other types of voice prompts.

The transmitter then begins recording the prompt using the telephone handset microphone. When the F-key is released, the prompt is played back through the handset for user verification. The user can then hang-up the phone. Generally, the CO allows up to 10 seconds of silence after breaking the dial-tone, thus allowing ample time to record the voice prompt.

Alternatively, the voice prompt may be recorded using the setup feature. A menu is selected which places the telephone interface into a state waiting for the line to ring. Once a ring is detected, the interface seizes the line and plays a tone indicating that the user should begin recording the new voice prompt. Once the user stops speaking for one second, the interface signals the processor to stop recording.

Figure 6:
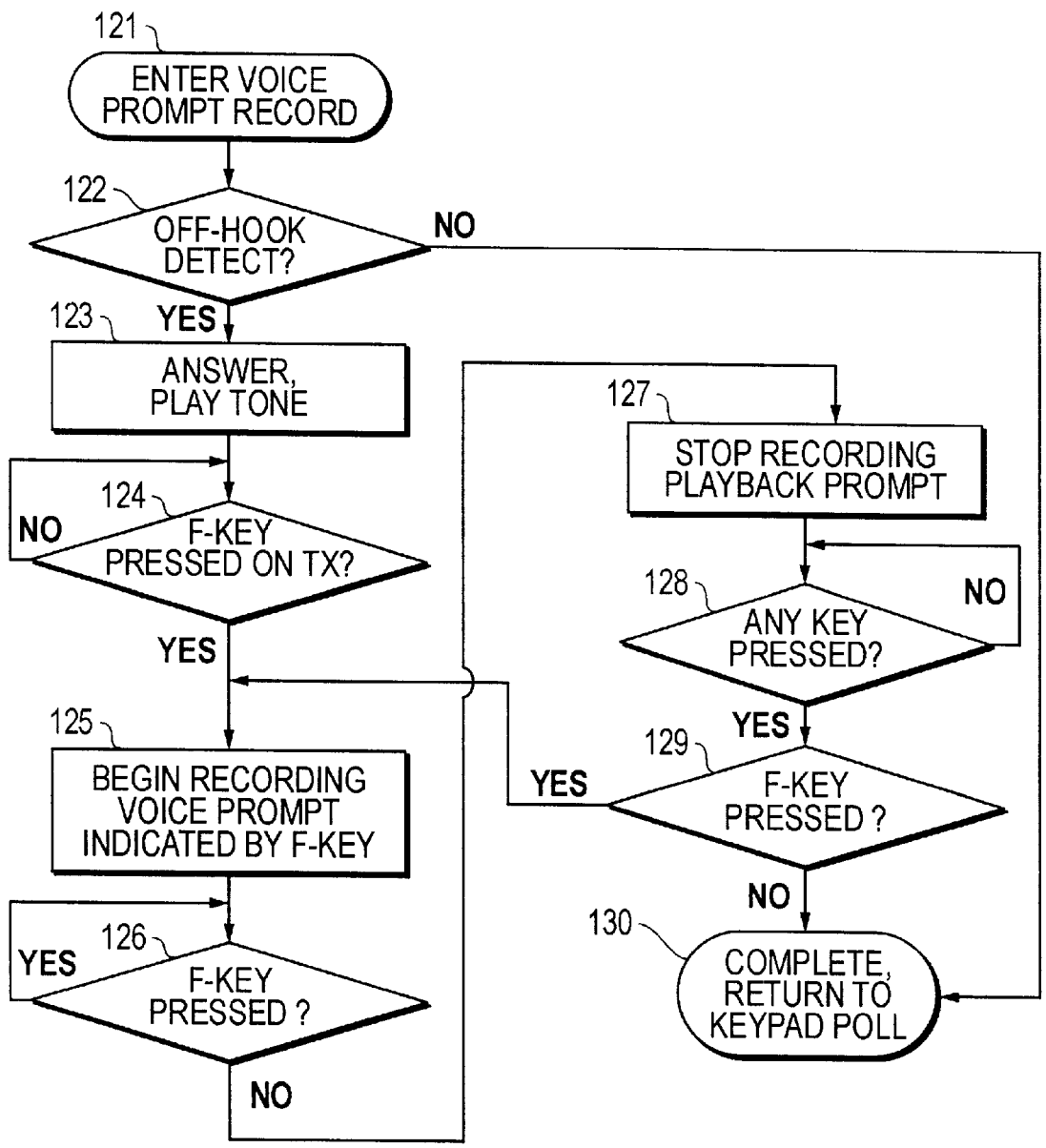
FIG. 6 is a flow chart illustrating the steps of a voice-prompt recording routine performed in the method of the present invention.

A more detailed look at the voice-prompt recording routine is shown in FIG. 6. The voice-prompt recording routine is entered at step 121, and at step 122, an off-hook detection is performed. The user may, for example, pick up the local handset and press "1" or any other digit other than "0" on the phone to break the dial-tone with the central office. If an off-hook condition is not detected, the process moves to step 130 where the process is complete, and the keypad returns to the keypad poll state. If an off-hook condition is detected at 122, the process moves to step 123 where the user answers and a tone is played. At 124, it is determined whether an F-key is pressed on the transmitter. If not, the process waits for an F-key to be pressed. When an F-key is pressed and held, the transmitter begins recording the type of voice prompt indicated by the F-key using the telephone handset microphone. As shown at step 126, the transmitter will continue to record until the F-key is released. The process then moves to step 127 where the recording is stopped, and the prompt is played back through the handset for user verification. At step 128, it is determined whether any key is pressed. If not, the process waits for a key to be pressed. If a key is pressed, the process moves to step 129 where it is determined whether an F-key has been pressed again. If so, the process returns to step 125 and begins recording the type of voice prompt indicated by the F-key. If an F-key is not pressed at 129, the process moves to step 130 where the process is complete, and the keypad returns to the keypad poll state. The user can then hang up the local handset at any time.

SYSTEM OPERATION

The system is capable of distinguishing between guest pagers and staff pagers. Pagers for guests and for staff personnel can include on-premises paging devices, commercial wide area pagers, and cellular telephones. For wide area pagers and cellular telephones, the system dials out an appropriate telephone number to effect the page.

In the scenario of a restaurant, where guests are waiting for tables, the hostess (user) determines from the guest whether the guest has a wide area pager or a cellular telephone that can be used to notify the guest that a table is ready. If the guest chooses not to use his/her wide area pager or cellular telephone, or does not have one, the hostess provides the guest with an on-premises pager. The hostess then indicates to the system which type of paging device will be utilized, and, utilizing the keypad 13 or display screen 12, enters either an ID number for an on-premises pager, or the appropriate telephone number for the guest's wide area pager or cellular telephone along with any required PIN. The control processor then provides the hostess with an index number to refer back the particular guest when sending a page.

In this scenario, it is presumed that a guest arrives with a cellular telephone. The hostess presses the CELL key and enters the telephone number in the system. The system issues, for example, the index number 501. Alternatively, the next guest may have a wide area pager. When the hostess presses the WAP key and enters the wide area pager telephone number, the index number 251 may be issued. A third guest may then arrive and not have a pager or a cellular telephone. The hostess then provides the guest with an on-premises pager, presses the PGR key, and enters an ID number for the on-premises pager. The system may then issue the index number 1.

To page a guest, the hostess enters the index number of the on-premises pager, wide area pager, or cellular telephone, followed by the enter key. If the paging device is an on-premises pager, the transmitter takes the RF section out of stand-by and transmits the local page. The RF section is placed back into stand-by when complete. Wide area pagers or cellular telephones are paged by the processor using the telephone number previously entered by the hostess. A telephone phone line is seized and the stored number is dialed. This is followed by an alpha-numeric prompt in the case of pagers or a voice prompt for cellular telephones. If the call is improperly terminated or busy, CIT tones are detected, or an early disconnect occurs, the transmitter makes additional attempts to complete the call.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. An on-premises multi-mode paging system that selectively pages an individual on a premises either through an on-premises pager assigned by the system, or through a wide area pager assigned to a separate wide area paging network, said system comprising:
    an input mechanism for inputting a preferred paging mode for the individual, said input mechanism including:
        means for inputting an identification number of the on-premises pager when the individual is assigned an on-premises pager; and
        means for inputting a telephone number for paging the wide area pager through the separate wide area paging network when the individual is not assigned an on-premises pager;
    an on-premises radio frequency (RF) transmitter for directly paging the on-premises pager using the input identification number;
    means for dialing out a telephone call to the input telephone number to page the wide area pager through the separate wide area paging network; and
    a control processor that receives the preferred paging mode from the input mechanism and directs the RF transmitter to page the individual on the on-premises pager when the individual is assigned an on-premises pager, or directs the telephone dialing means to page the individual on the wide area pager when the individual is not assigned an on-premises pager.

2. An on-premises multi-mode paging system that selectively pages an individual on a premises either through an on-premises pager assigned by the system, or through a cellular telephone assigned to a separate cellular communications network, said system comprising:
    an input mechanism for inputting a preferred paging mode for the individual, said input mechanism including:
        means for inputting an identification number of the on-premises pager when the individual is assigned an on-premises pager; and
        means for inputting a telephone number for the cellular telephone when the individual is not assigned an on-premises pager;
    an on-premises radio frequency (RF) transmitter for directly paging the on-premises pager using the input identification number;

means for dialing out a telephone call to the input cellular telephone number; and a control processor that receives the preferred paging mode from the input mechanism and directs the RF transmitter to page the individual on the on-premises pager when the individual is assigned an on-premises pager, or directs the telephone dialing means to call the individual on the cellular telephone when the individual is not assigned an on-premises pager.

3. An on-premises multi-mode paging system that selectively pages a plurality of individuals on a premises through one of a plurality of paging mechanisms, said system comprising:

an input mechanism for inputting a preferred paging mechanism for each of the plurality of individuals;

a first paging mechanism comprising an on-premises radio frequency (RF) transmitter for directly paging on-premises pagers that are compatible with the RF transmitter;

a second paging mechanism comprising means for selectively dialing out telephone calls to cellular telephones or wide area pagers that are not compatible with the on-premises RF transmitter; and a control processor that selects the input preferred paging mechanism for each individual to be paged, and directs the selected paging mechanism to page the individual.

4. The on-premises multi-mode paging system of claim 3 wherein the input mechanism includes a memory device in which individuals to be paged are associated with an on-premises pager identification number, a wide area pager telephone number, or a cellular telephone number.

5. The on-premises multi-mode paging system of claim 4 wherein the input mechanism also includes a keypad for a user to enter the on-premises pager identification numbers, wide area pager telephone numbers, and cellular telephone numbers for individuals to be paged.

6. The on-premises multi-mode paging system of claim 3 further comprising a wireless radio interface that connects the control processor to the RF transmitter.

7. The on-premises multi-mode paging system of claim 3 wherein the RF transmitter and the control processor are connected to a local area network (LAN), and the system further comprises a LAN interface that connects the control processor to the LAN.

8. The on-premises multi-mode paging system of claim 3 wherein the means for selectively dialing out a telephone call includes:

an auto-dialer;

a modem; and an interface to the Public Switched Telephone Network (PSTN) and the Public Land Mobile Network (PLMN).

9. The on-premises multi-mode paging system of claim 3 further comprising:

a seating management system; and an RS232 interface that connects the control processor to the seating management system.

10. The on-premises multi-mode paging system of claim 9 wherein the RS232 interface also connects the control processor to the RF transmitter.

11. The on-premises multi-mode paging system of claim 3 wherein the control processor is remotely located from the premises, and the system includes means for communicating data between the premises and the processor.

12. A method of selectively paging a plurality of individuals on a premises through one of a plurality of paging mechanisms, said method comprising the steps of:

inputting into a memory device, a preferred paging mechanism for each individual, said preferred paging mechanism being alternatively, an on-premises paging system, a wide area paging system, or a cellular telephone network;

determining by a control processor, which of the plurality of paging mechanisms is the preferred paging mechanism to be utilized to page each individual; and paging each of the plurality of individuals utilizing the determined preferred paging mechanism for each individual.

13. A method of selectively paging a particular individual in a plurality of individuals on a premises through one of a plurality of paging mechanisms, said method comprising the steps of:

inputting into a memory device, an indication of a paging mechanism to be utilized to page each individual;

receiving an input from a user to page a particular individual;

determining by a control processor, which of the plurality of paging mechanisms is to be utilized to page the particular individual by retrieving from the memory device, the indication of the paging mechanism to be utilized to page the particular individual;

paging the particular individual through an on-premises paging system upon determining that the on-premises paging system is to be utilized to page the individual;

paging the particular individual through a wide area paging system upon determining that the wide area paging system is to be utilized to page the individual; and paging the particular individual through a cellular telephone upon determining that the cellular telephone is to be utilized to page the individual.

* * * * *